United States Patent

Hirata

[11] 4,186,334
[45] Jan. 29, 1980

[54] CONTROL SYSTEMS OF ALTERNATING CURRENT MOTORS

[75] Inventor: Akio Hirata, Koganei, Japan

[73] Assignee: Tokyo Shibaura Denki Kabushiki Kaisha, Kanagawa, Japan

[21] Appl. No.: 875,897

[22] Filed: Feb. 7, 1978

[51] Int. Cl.$^2$ .................................. H02P 7/36
[52] U.S. Cl. ................................ 318/805; 318/810; 318/811
[58] Field of Search .............. 318/227, 230, 231, 798, 318/803, 805, 810, 811, 812

[56] References Cited

U.S. PATENT DOCUMENTS

| | | | |
|---|---|---|---|
| 3,619,749 | 11/1971 | Schieman | 318/227 X |
| 3,619,750 | 11/1971 | Mokrytzki et al. | 318/227 X |
| 3,919,609 | 11/1975 | Klavtschek et al. | 318/227 |
| 4,001,660 | 1/1977 | Lipo | 318/227 |
| 4,019,105 | 4/1977 | Cornell et al. | 318/227 |
| 4,041,361 | 8/1977 | Cornell | 318/227 |

OTHER PUBLICATIONS

Kume et al., "Speed Transient of Induction Motor Driven by Current Source Type Inverter", IEEE Conf. Rec. Ann. Meeting Ind. — Appl. Soc., 1973, 8th, pp. 865–874.

*Primary Examiner*—Gene Z. Rubinson
*Assistant Examiner*—Eugene S. Indyk
*Attorney, Agent, or Firm*—Stevens, Davis, Miller & Mosher

[57] ABSTRACT

In a control system of an alternating current motor energized by serially connected rectifier and inverter wherein the output DC voltage of the rectifier is controlled by a phase controller which is controlled by a phase control signal and the output frequency of the inverter is controlled by a speed reference signal there is provided a power factor detector which differentiates the phase control signal or the DC voltage and the output of the phase detector is added to the speed reference signal so as to suppress low frequency oscillations of the torque of the motor.

4 Claims, 7 Drawing Figures

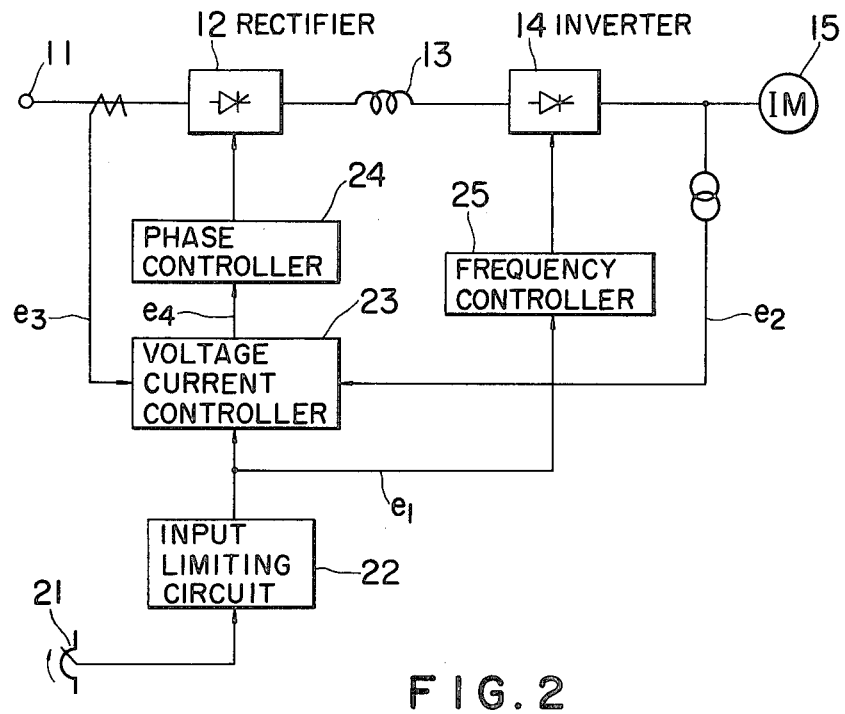
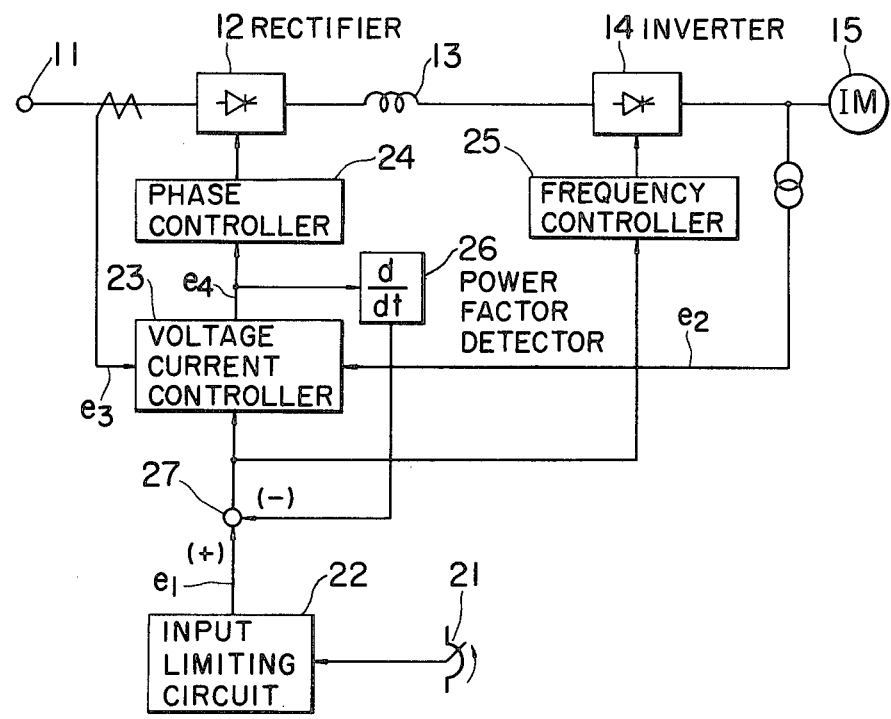

CONTROL SYSTEMS OF ALTERNATING CURRENT MOTORS

BACKGROUND OF THE INVENTION

This invention relates to a control system of an alternating current motor wherein the motor is energized by a separate excitation type frequency converter including serially connected rectifier and inverter.

Although the invention is applicable to the control of an alternating current motor energized by a constant current type inverter of the indirect frequency converter type or a cycloconverter of the indirect frequency converter type, in the following the invention will be described as applied to the control of an induction motor which is energized by a well known constant current type inverter as shown in FIG. 1, wherein alternating current supplied to an input terminal 11 is rectified by a rectifier 12, the direct current is smoothed by a DC reactor 13 and then converted into alternating current by an inverter 14 for energizing an induction motor 15. As diagrammatically shown, the rectifier and inverter comprise semiconductor switching elements such as thyristors or power transistors which are connected in a manner well known in the art. In the current type inverter, the output voltage is sinusoidal and the output current is rectangular, whereas in the voltage type inverter the output voltage is rectangular but the output current is substantially sinusoidal. The former type is suitable for large current and can regenerate the power of the alternating current motor by changing the phase control angle α of the rectifier from 0°–90° to 90°–180°.

The control system shown in FIG. 1 comprises a reference setter 21 which produces a speed reference signal $e_1$, an input limiting circuit 22 which is constructed to modify the reference signal $e_1$ in accordance with the current flowing through the frequency converter for limiting the current, a voltage/current controller 23 which is constructed to compensate for the voltage drop of the converter circuit caused by the primary current of the motor 15 and to control the primary current, and a phase controller 24 which in response to the output signal $e_4$ of the voltage/current controller 23 changes the phase control angle α of the rectifier 12 from 0°–90° to 90°–180°, and vice versa, depending upon whether the rectifier 12 operates as a rectifier or an inverter at the time of regeneration. The inverter 14 is provided with a frequency controller 25 which is constructed to control the output frequency of the inverter. Since these circuit elements are well known in the art, description of the detail thereof is believed unnecessary.

It is assumed now that the AC voltage supplied to the induction motor 15 is controlled by a closed loop in which a speed reference signal $e_1$ and an output voltage feedback signal $e_2$ are compared and that the frequency of the alternating current is controlled by an open loop utilizing a digital control signal obtained by passing the speed reference signal $e_1$ through an analogue-digital converter. When such control system is used, the torque of the induction motor 15 is determined by such factors as the output voltage, the current and frequency of the inverter output and the slip frequency or power factor of the induction motor, but with such control system as the power factor (cos θ) of the load is not controlled, unstable phenomena occur under specific load conditions wherein the output voltage and current of the inverter oscillate at low frequencies.

Such unstable phenomena are caused by various factors but it has been considered that such phenomena are caused mainly by a high output impedance of the frequency converter and by the fact that the phase of the output current is fixed. More particularly, when the induction motor 15 is subjected to such external disturbances as load variations, the phase of the induced electromotive force and hence the induced magnetic flux of the induction motor vary and such phase variation and the output of the frequency converter undergo mutual interference thereby causing low frequency oscillations. As above described, since such low frequency oscillations are caused by the induction motor it is impossible to suppress them by the output voltage control loop of the frequency converter so that the low frequency oscillations persist.

SUMMARY OF THE INVENTION

It is an object of this invention to provide an improved control system of alternating current motor energized by a current type frequency changer capable of preventing unstable phenomena in which the output current of the frequency converter and the torque of the motor oscillate at low frequencies.

According to this invention there is provided a control system of an alternating current motor which is energized by a current type frequency converter including serially connected rectifier and inverter wherein the output direct current voltage of the rectifier is controlled by a phase controller which is controlled by a phase control signal and the output frequency of the inverter is controlled by a speed reference signal, wherein there are provided a power factor detector which detects the power factor of the motor, and means for adding the output of the power factor detector to the speed reference signal so as to suppress low frequency oscillations of the torque of the motor.

In one example, the power factor detector comprises means which differentiates the phase control signal, whereas in the other example comprises means which differentiates the output direct current voltage of the rectifier.

BRIEF DESCRIPTION OF THE DRAWINGS

Further objects and advantages as well as the organization of this invention can be more fully understood from the following detailed description taken in conjunction with the accompanying drawings in which:

FIG. 1 is a block diagram showing one example of a prior art control system for an alternating current motor energized by a current type inverter; motor energized by a current type inverter;

FIG. 2 is a block diagram showing one embodiment of this invention;

DESCRIPTION OF THE PREFERRED EMBODIMENTS

Figure 3:
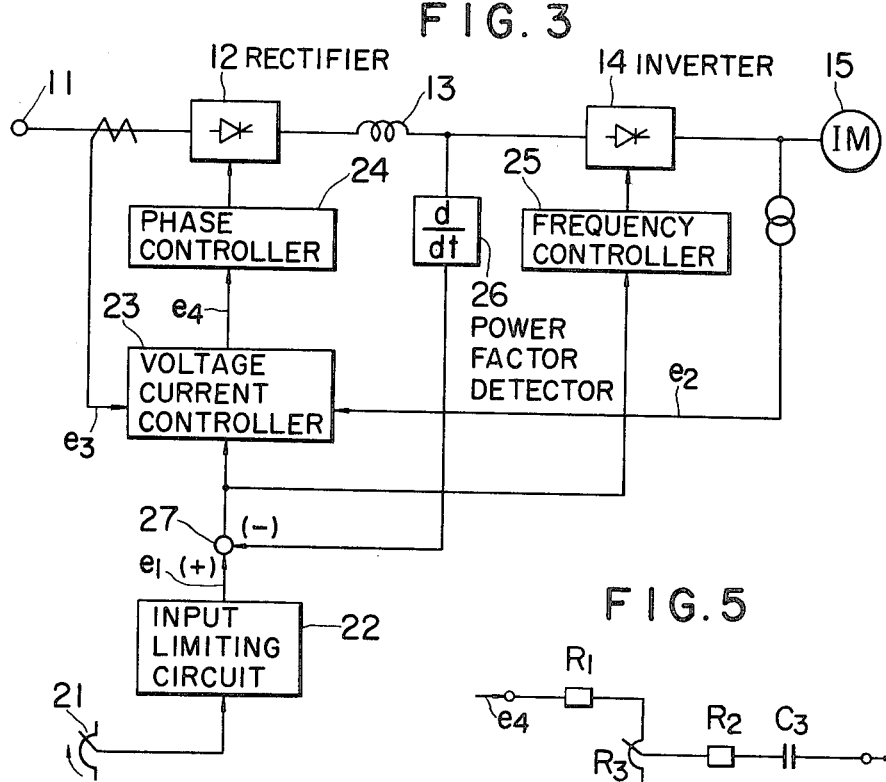
FIG. 3 is a block diagram showing another embodiment of this invention.

In a preferred embodiment of this invention illustrated in FIG. 2, a power factor detector 26 and an adder/subtractor 27 are added to the control system shown in FIG. 1. When a low frequency oscillation is generated as above described, the torque, slip frequency and power factor of the induction motor 15 vary. According to this invention, a variation in the power factor is detected and such unstable phenomenon is damped rapidly.

In a current type rectifier-inverter, the DC voltage of the rectifier is a function of the output AC voltage and the power factor cos $\theta$ of the load. Since the input signal $e_4$ to the phase controller 24 of the rectifier 12 and the DC voltage are correlated with each other, the input signal $e_4$ varies in proportion to the variation in the DC voltage, and the variation in the input signal $e_4$ corresponds to the variation in the power factor $\theta$ of the load. For this reason, the variation in the DC voltage and hence the power factor $\theta$ can be detected by detecting the variation of the input signal $e_4$.

In the embodiment shown in FIG. 2, the variation in the input signal $e_4$ is derived out by differentiating the same by the power factor detector 26 and the signal thus obtained is added to the speed reference signal $e_1$ through adder/subtractor 27. More particularly, when signal $e_4$ increases in the positive direction for improving the power factor $\theta$ of the load, the control is effected to decrease the output signal of the adder/subtractor 27 so as to damp the variation of the power factor, thereby efficiently preventing a unstable phenomenon caused by the low frequency oscillation.

Figure 5:
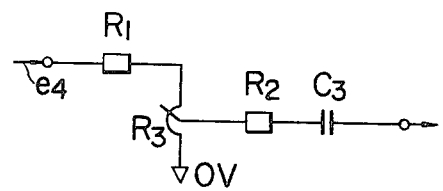
FIG. 5 shows one example of the power factor detector.

FIG. 5 shows one example of the power factor detector 26 utilized in the embodiment shown in FIG. 2. As above described it acts as a differenting circuit and comprises a resistor $R_1$ having one end connected to receive input signal $e_4$ and a variable resistor $R_3$ which are connected in series and utilized to adjust the value of signal $e_4$. The power factor detector further comprises a resistor $R_2$ connected to the movable arm of the variable resistor $R_3$ and a capacitor $C_1$ connected in series with resistor $R_2$. The resistor $R_2$ and capacitor $C_1$ are used to determine the time constant.

A modified embodiment shown in FIG. 3 is similar to that shown in FIG. 2 except that the DC voltage is applied to the input of the power factor detector 26 and operates in the same manner. In the system shown in FIG. 2, there is a delay in the power factor detection due to the characteristics of the phase controller 24 and the rectifier 12 and the effect of the DC reactor 13, but the modified control system shown in FIG. 3 is free from such delay of detection. However, it is necessary to use an insulating device for insulating the power factor detector 26 from the DC voltage.

Figure 4A:
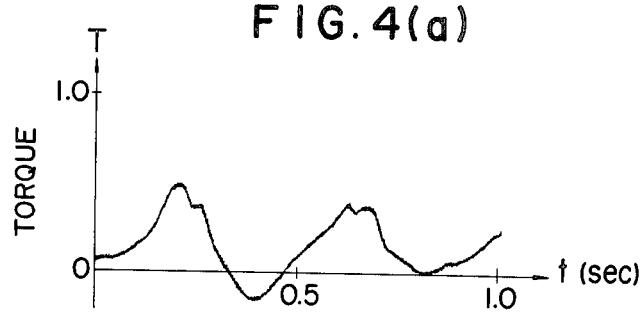
FIGS. 4a, 4b and 4c show torque-time curves for explaining the novel effect of this invention.
Figure 4B:
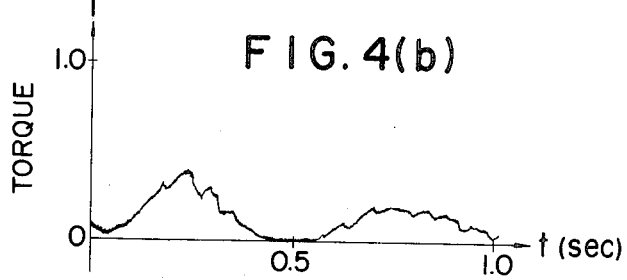
Figure 4C:
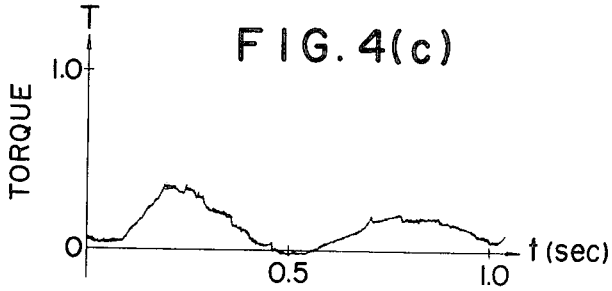

FIGS. 4a, 4b and 4c are torque-time curves demonstrating the novel effect of this invention which were depicted by plotting the result of stability test performed by varying the speed reference signal $e_1$ by 2%. FIG. 4a shows the torque curve of the prior art system shown in FIG. 2 whereas FIGS. 4b and 4c show the torque curves of the control systems shown in FIGS. 2 and 3 respectively. As shown in FIGS. 4b and 4c, the amplitude of the second oscillation wave is reduced to about one half of that shown in FIG. 4a during one cycle of the oscillation which shows that the stability of the control system has been substantially improved by this invention. Although not shown, the curve shown in FIG. 4a persists for many cycles, but the curves shown in FIGS. 4b and 4c attenuate very rapidly. As can be noted from FIGS. 4a and 4b the sensitivities of the control systems shown in FIGS. 2 and 3 are substantially equal. The stability can be improved further by properly adjusting the power factor detector 26.

As above described, according to this invention, when the power factor of the alternating current varies the output voltage and frequency of the frequency converter vary in a direction to damp such variation of the power factor so as to suppress the low frequency oscillation. Accordingly, it is possible to prevent unstable phenomenon in which the torque of the motor oscillates at a low frequency thus assuring stable running of the motor.

I claim:

1. In a control system of an alternating current motor which is energized by a current type frequency converter including a serially connected rectifier and inverter wherein the output direct current voltage of said rectifier is controlled by a phase controller which is controlled by a phase control signal, the output frequency of said inverter and a speed reference signal, the improvement which comprises a power factor detector which differentiates said phase control signal, and means for adding the output of said power factor detector to said speed reference signal so as to suppress low frequency oscillations of the torque of said motor.

2. The control system according to claim 1 which further comprises a voltage/current controller which converts said speed reference signal into said phase control signal in response to the input current to said rectifier and the output voltage of said inverter.

3. In a control system of an alternating current motor which is energized by a current type frequency converter including a serially connected rectifier and inverter wherein the output direct current voltage of said rectifier is controlled by a phase controller which is controlled by a phase control signal, the output frequency of said inverter and a speed reference signal, the improvement which comprises a power factor detector which differentiates the output direct current voltage of said rectifier, and means for adding the output of said power factor detector to said speed reference signal so as to suppress low frequency oscillations of the torque of said motor.

4. The control system according to claim 3 which further comprises a voltage/current controller which converts said speed reference signal into said phase control signal in response to the input current to said rectifier and the output voltage of said inverter.

* * * * *